Oct. 8, 1929.      M. C. SCROTE      1,731,027
TIRE MAKING MACHINE
Filed Oct. 25, 1927      4 Sheets-Sheet 3
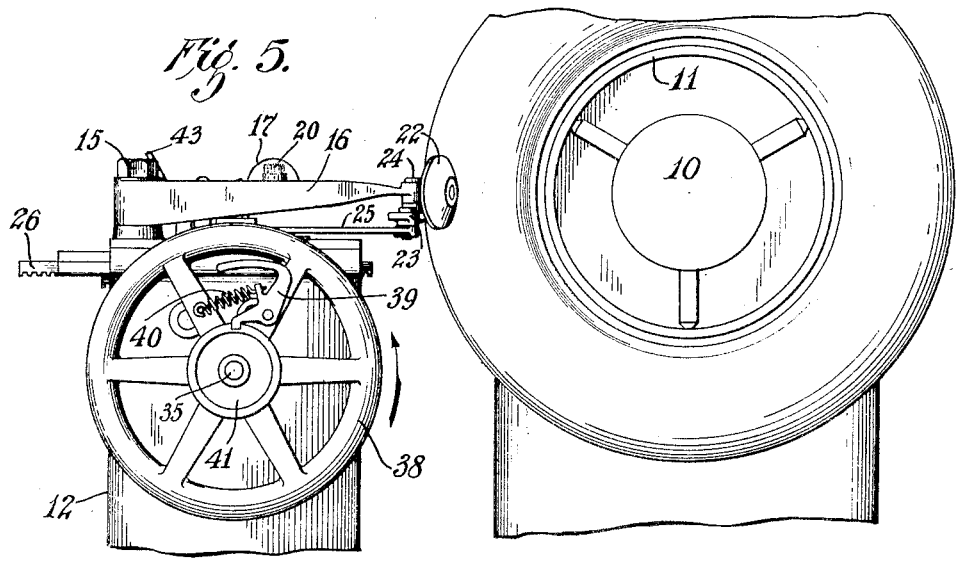
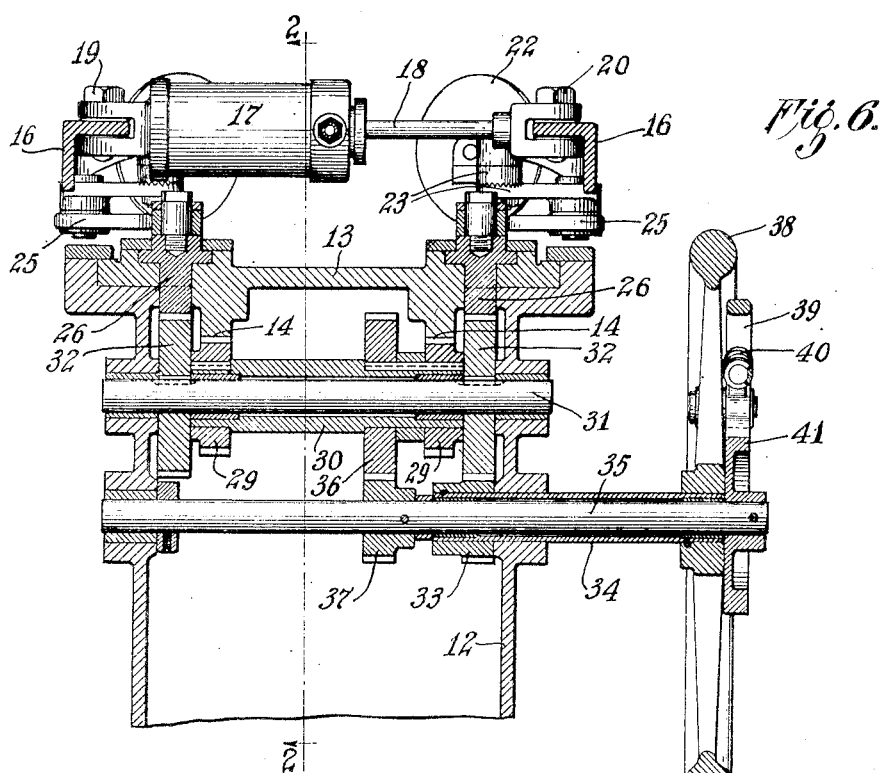

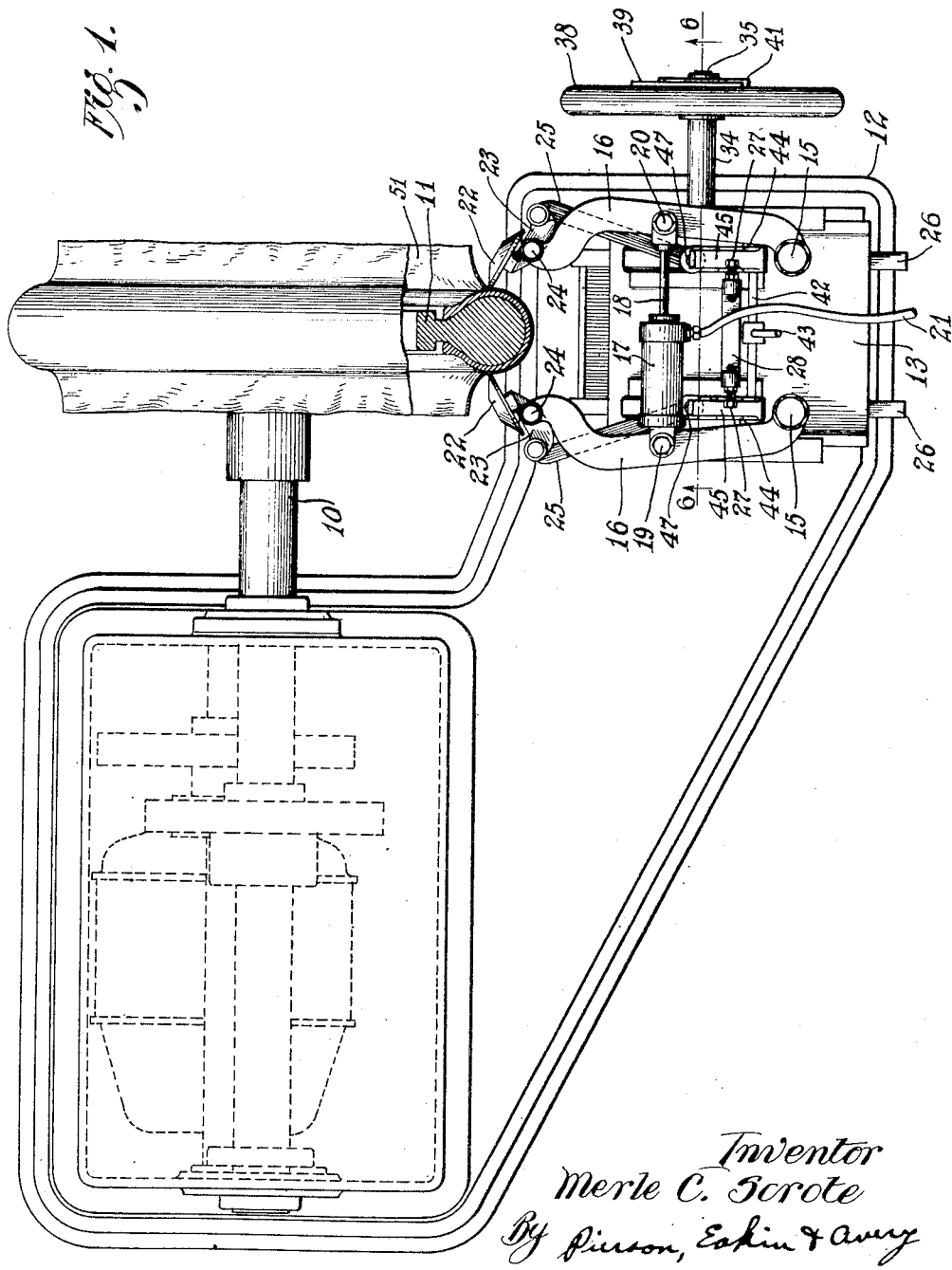

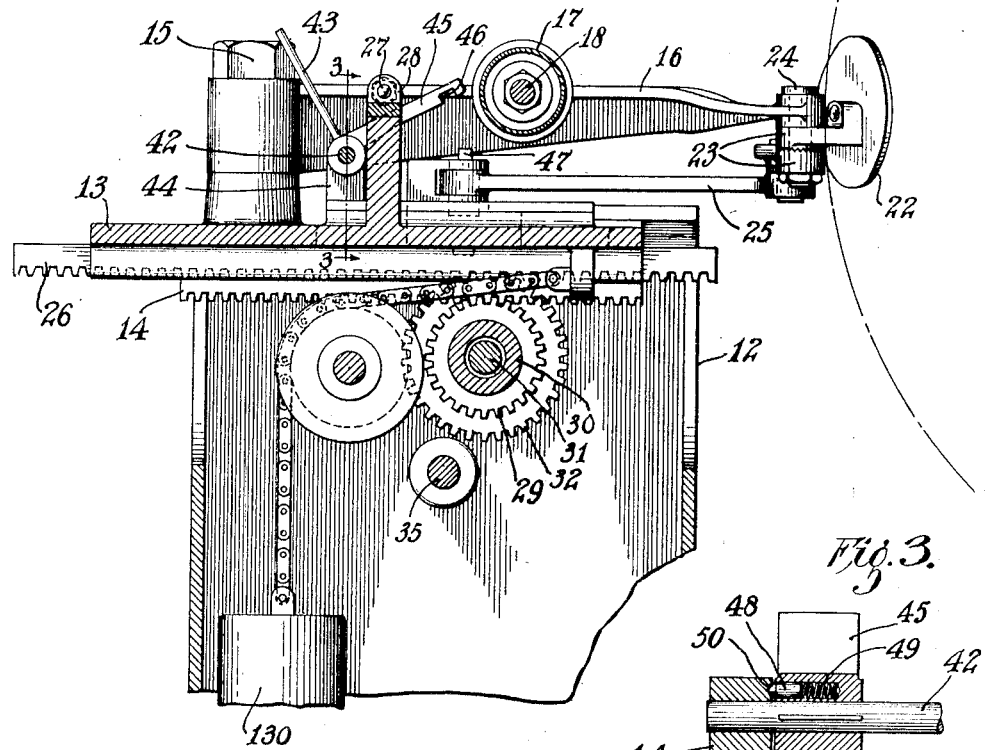
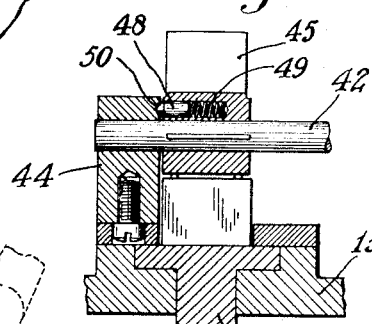
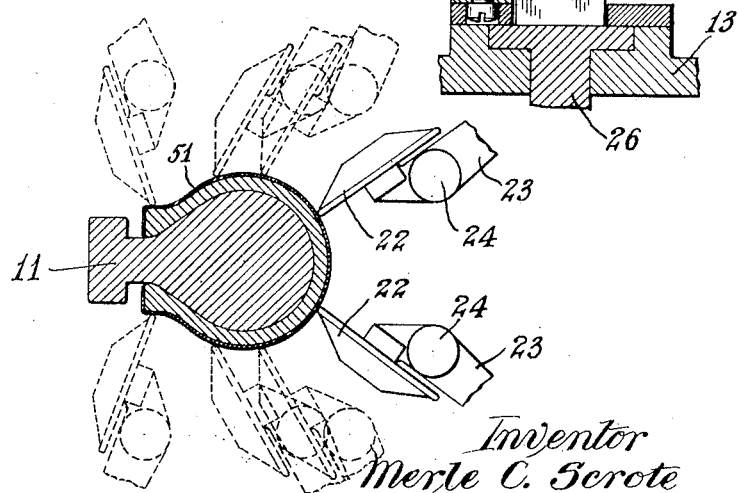

Oct. 8, 1929.   M. C. SCROTE   1,731,027
TIRE MAKING MACHINE
Filed Oct. 25, 1927   4 Sheets-Sheet 4
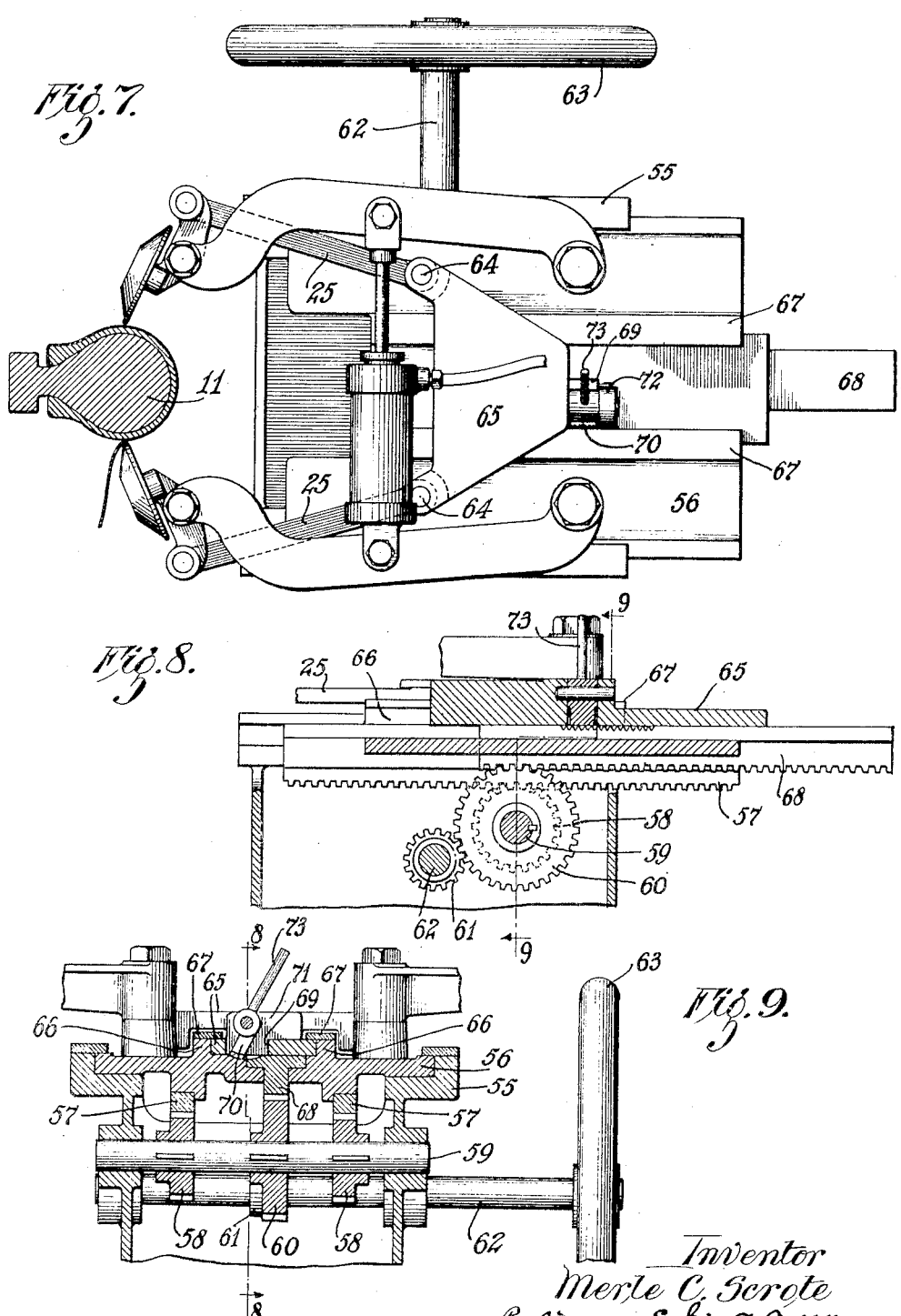
Inventor
Merle C. Scrote
By Pierson, Eakin & Avery
Attys.

Patented Oct. 8, 1929

1,731,027

UNITED STATES PATENT OFFICE

MERLE C. SCROTE, OF KENMORE, OHIO, ASSIGNOR TO THE B. F. GOODRICH COMPANY, OF NEW YORK, N. Y., A CORPORATION OF NEW YORK

TIRE-MAKING MACHINE

Application filed October 25, 1927. Serial No. 228,608.

This invention relates to tire making machines and its chief objects are to provide, in a machine comprising stitcher-tools adapted to operate at different angles to the middle plane of the tire core as they are moved from the tread portion to the bead portion of the core, means whereby the angular relation of the stitcher-tool to the core may be readily controlled at will, in order that the machine may be efficiently employed for making tires of different sizes throughout a wide range of sizes; and to provide a simple mechanism for so controlling the angular relation of the stitcher to the core.

Of the accompanying drawings:

Fig. 1 is a plan view of a machine embodying my invention, parts of the tire-building core and the work thereon being sectioned and broken away.

Fig. 2 is a longitudinal, vertical section of the stitcher-tool stand, on line 2—2 of Fig. 6.

Fig. 3 is a section on line 3—3 of Fig. 2.

Fig. 4 is a horizontal section of the tire-building core and the work thereon, at the position of the stitchers, showing the stitchers at different operative positions.

Fig. 5 is a side elevation of the machine, from the right of Fig. 1.

Fig. 6 is a transverse section of the machine, on line 6—6 of Fig. 1.

Fig. 7 is a plan view of the preferred embodiment of the invention, the tire-building core and the work thereon being shown in section.

Fig. 8 is a section on line 8—8 of Fig. 9.

Fig. 9 is a section on line 9—9 of Fig. 8.

Referring to the drawings, the embodiment of the invention shown in Figs. 1 to 6 comprises a core-rotating device 10, with a tire-building core 11 mounted thereon, and a stitcher-stand 12.

Mounted upon the stitcher-stand 12 is a slide or tool-carriage 13 formed on its lower side with two sets of rack teeth 14, 14 (Figs. 6 and 2), for driving the carriage toward and from the tire-building core 11.

Fulcrumed upon the slide or tool-carriage 13 at 15, 15 are a pair of stitcher arms 16, 16 (see Fig. 1) connected at their middle parts by a fluid pressure device including a cylinder 17 and a piston-rod 18, pivoted to the arms respectively at 19 and 20, for yieldingly urging the arms 16 toward each other, the cylinder being provided with a flexible pipe 21 for charging and venting its inner end, and a compression spring (not shown) being mounted in the cylinder for returning the piston to the inner end of the cylinder when the cylinder is vented.

A pair of stitcher-tools 22, 22 are journaled upon short levers 23, 23 respectively which are fulcrumed at 24, 24 upon the outer ends of the stitcher arms 16, the outer arms of the levers 23 being connected by links 25, 25 with respective racks 26, 26 (see Fig. 6) slidably mounted upon the tool-carriage 13 with their teeth exposed below the latter, for driving the racks to actuate the links 25 and thus to swing the levers 23 and their stitcher-tools 22 about the pivots 24 and thus to change the angular relation of the stitchers to the middle plane of the tire core while the stitcher-tools are held against the work, by the fluid pressure device 17, 18, and are moved over the side faces of the work from the tread portion toward the bead portions thereof by a forward movement of the sliding tool-carriage 13.

To limit the inward movement of the stitcher-tools 22 and thus determine their starting positions upon the work at the tread portion thereof, and permissibly to prevent them from contacting the metallic core 11 beyond the bead portions of the tire, adjustable stop screws 27, 27 are mounted upon a bracket 28 (see Fig. 1) secured upon the slide 13 and are adapted to be abutted by the stitcher arms 16 under the force of the fluid pressure device 17, 18.

For driving the tool-carriage 13 forward, against the force of a return device including a weight 130 (Fig. 2) to advance the stitching operation from the tread portion toward the bead portion of the core and for concurrently driving forward the racks 26 at a faster speed than that of the carriage, to cause the links 25 to change the angularity of the stitcher-tools, the racks 14 of the carriage (see Fig. 6) are meshed with respective, comparatively small pinions 29, 29 secured upon a quill or sleeve 30 journaled upon a shaft 31, and the racks 26 are meshed with respective, comparatively large pinions 32, 32 secured upon the shaft 31, so that when the quill 30 and shaft 31 are driven at the same speed the racks 26 will be driven forward faster than the carriage 13 because of the large size of the pinions 32 as compared with the pinions 29.

For driving the quill 30 and shaft 31 at equal speed, one of the pinions 32 is meshed with a pinion 33 secured upon a quill 34 surrounding a shaft 35 and a pinion 36 of the same size as the pinions 32 is secured upon the quill 30 and is meshed with a pinion 37, which is of the same size as the pinion 33 and is secured upon the shaft 35, and a hand-wheel 38 secured upon the quill 34 has mounted thereon a pawl 39 adapted to be held by pull spring 40 in driving engagement with a ratchet 41 secured upon the shaft 35, as shown clearly in Figs. 5 and 6, so that rotation of the hand wheel 38 counter clock-wise as viewed in Fig. 5, drives the two trains of gearing at equal angular speeds up to and including the differential pinions 29 and 32.

In order that the change of angularity of the stitcher-tools 22 may be stopped for a part of their forward movement so that, for example, they may operate at the same angle to the middle plane of the core for a substantial distance radially of the latter, as shown by the two middle, dotted line positions of the stitchers in Fig. 4, means is provided for latching the racks 26 and the carriage 13 together at will, to compel them to move at equal speed, the gearing as shown in Fig. 6 being such that when the pawl 39 is manually disengaged from the ratchet 41, and the racks and carriage are latched together and are driven forward at equal speed by means of hand-wheel 38, the ratchet 41, through the pinions 29, 36, 37 and shaft 35 will be driven counter clock-wise as viewed in Fig. 5 at an angular speed greater than that of the hand wheel 38.

The means shown in Figs. 1, 2 and 3 for latching the racks 26 to the carriage 13 comprises a small transverse rock shaft 42 provided with a hand lever 43 and journaled in brackets 44, 44 rising from the carriage 13, the shaft 42 having secured thereon just inside of the respective brackets a pair of latch members 45, 45 formed at their outer ends with respective downwardly open notches such as the notch 46 (Fig. 2) adapted to engage upon the tops of the adjacent pivot pins 47, 47 of the links 25 when the latch members are turned downward to latched position by means of the hand lever 43. The tops of the pivot pins 47 are formed with flat sides, as shown clearly in Figs. 1 and 6, to adapt them to fit into the notches 46 of the latch members 45.

For releasably holding the latch members 45 in either their latching positions or released positions one of the latching members is formed in its hub with a recess in which is mounted plunger 48 backed by a compression spring 49 (Fig. 3), the plunger being formed with a rounded outer end adapted to engage in one or the other of a pair of dimples such as the dimple 50 in Fig. 3 formed at suitable positions in the adjacent bracket 44.

In the operation of the machine, the carriage 13 being retracted from the tire-building core 11 and an endless band of tire fabric 51 being mounted upon the core or upon previously applied bands of tire building material, and the cylinder 17 being charged so that the stitcher-tools 22 are held close together with their arms 16 against the stop screws 27, the core 11 is rotated and the hand wheel 38 is turned counter clockwise as viewed in Fig. 5, which drives the carriage 13 toward the core, to cause the stitchers to progress inwardly thereon while they are yieldingly held against the work by the fluid pressure device 17, 18, and at the same time the rotation of the hand wheel 38 with its quill 34, acting through the pinion 33, drives the racks 26 forward faster than the carriage 13 and thus causes the stitcher-tools 22 to turn about their pivots 24 from approximately their full line positions of Fig. 4 to their next adjacent dotted line positions in Fig. 4, whereupon the operator engages the latch members 45 with the studs or pivot pins 47 and then lifts the pawl 39 from the ratchet 41.

In further turning of the hand-wheel 38 the latched carriage and racks move forward together, so that the stitcher-tools move forward for some distance at the sides of the core without substantially changing the angular relation of their axes to the plane of the core, as indicated by the intermediate dotted line positions of the stitchers shown in Fig. 4, after which the latch members 45 are lifted from the pins 47 and the hand wheel is further turned to carry the stitching operation to the beads of the tire. The engagement of the pawl 39 in the notch of the ratchet 41 causes the swinging movement of the stitchers to be resumed as the stitchers proceed to the heels of the beads, as shown in dotted lines in Fig. 4. The carriage is then so shifted in position by means of the hand wheel as to carry the stitching operation over the heels of the beads and over the inner faces of the beads to the toes of the latter.

The cylinder 17 is then exhausted to permit the stitcher-tools and their supporting levers to be swung widely apart to clear the work, the carriage is returned to its starting position by the weight 130, and the hand wheel 38 is turned to return the racks back to their starting position with relation to the carriage.

The operation as described is then repeated.

In the modified machine shown in Figs. 7 and 8, constituting the preferred embodiment of the invention, the machine frame, 55, has mounted thereon a tool-carriage 56 having secured to its lower face a pair of racks 57, 57 meshed with respective pinions 58, 58 secured on a shaft 59 for driving the carriage toward and from the tire-building core 11, the shaft 59 having secured thereon a relatively large pinion 60 meshed with a pinion 61 which is secured upon a drive shaft 62 provided outside of the machine frame with a handwheel 63.

The links 25 of the tool-actuating device have their rear ends pivoted at 64, 64 to a slide 65 mounted between guide-rails 66, 66 formed on the carriage, the slide being held down by retaining plates 67, 67.

Slidably mounted upon the carriage under the slide 65 is a rack 68 having its teeth exposed at the under side of the carriage and meshed with the pinion 60, which is larger than the carriage-driving pinions 58, so that rotation of the shaft 59 by means of the handwheel 63 will cause the rack 68 to move more rapidly than the carriage 56.

For alternatively anchoring the slide 65 to the rack 68, to cause the links to change the angularity of the tools as the carriage moves forward, or anchoring the slide 65 to the carriage, so that the tools will move forward without changing their angularity, the slide 65 is formed with a slot 69 through which extends a toothed, latching member 70 pivotally mounted between bearing brackets 71, 72 formed on the slide 65. The latching member 70 is provided with a handle 73 and is adapted to have its teeth engaged in a complemental set of arcuate-bottomed slots formed in the upper face of the carriage and to be turned about its pivot to engage its teeth in similar slots formed in the upper face of the rack 68. The portion of the rack which is formed with the said slots fits against the slotted portion of the carriage, and as the teeth of the latching member 70 are of substantial length they must engage in the slots of one of the slotted members before disengaging from those of the other, so that the slide 65 must always be anchored, by the latching member 70, to one or to the other of the carriage and the rack, and consequently the stitcher-tools are prevented from being swung about their pivots by pressure of the work when the latching member 70 is swung from one position to the other.

In the operation of this embodiment of the invention the latching member 70 is engaged with the rack 68 and not with the carriage when it is desired to have the tools move forward with change of angular relation. When it is desired to have them proceed without such change the latching member 70 is swung from the rack into engagement with the carriage, anchoring the slide to the latter and releasing the more rapidly moving rack, which then runs idle until such time as the latching member is swung back to it. The drive of the carriage and rack is preferably stopped or reduced in speed for the transfer of the latching member from one to the other.

The construction of this embodiment is very simple and yet is highly effective and dependable for the purposes specified.

Various modifications are possible within the scope of my invention as defined in the appended claims.

I claim:

1. A tire-making machine comprising a rotatably supported tire core, a tool-carriage, a tire-tool carried thereby, the carriage being mounted for movement toward and from the core to move the tool from the tread portion toward the bead portion of the core, means for urging the tool against the work as it is so moved, and means for automatically changing the angular relation of the tool to the middle plane of the core as an incident of the movement of the carriage toward the core, and means alternatively operable at the will of the operator during the stitcher operation for maintaining the said angular relation constant during at least a part of the said movement.

2. A tire-making machine comprising a rotatably supported tire core, a tool-carriage, a tire-tool carried thereby, the carriage being mounted for movement toward and from the core to move the tool from the tread portion toward the bead portion of the core, means for urging the tool against the work as it is so moved, a member having connection to the tool for changing the angular relation of the tool to the middle plane of the core, while the tool is so moved, by movement of the said member with relation to the carriage, means common to the said member and the carriage for driving the carriage toward the core and at the same time driving the said member with relation to the carriage, and means for anchoring the said member to the carriage and concurrently rendering the said driving means inoperative to drive the said member with relation to the carriage.

3. In a tire-making machine the combination of a slidably mounted tool-carriage, a rack slidably mounted thereon, a differential pinion device for driving the carriage and the rack at different speeds, a tire-tool carried by the carriage, and means for connecting the tire-tool alternatively with the rack and with the carriage for controlling the position of the tire-tool.

4. In a tire-making machine the combination of a slidably mounted tool-carriage, a tool-actuating member slidably mounted for movement approximately parallel with the movement of the carriage, a pivotally mounted tire-tool arm carried by the carriage, means including a link for turning the tire-tool arm about its pivot, means for driving the carriage and concurrently driving the said member with relation to the carriage, and means for hinging the said link alternatively to the said member and to the carriage.

5. A tire-making machine comprising a rotatably supported tire core, a tool-carriage mounted for movement toward and from the core, an arm pivoted on the carriage, a tire-tool arm pivoted on the said arm, a tire-tool journaled on the said tire-tool arm, a link for turning said tire-tool arm about its pivot, means for driving the carriage toward the core, means for moving the said link with relation to the carriage as an incident of the movement of the carriage toward the core, and means for anchoring the link to the carriage throughout a part of the movement of the carriage toward the core.

6. In a tire-making machine the combination of a tire-tool, two members slidably mounted side by side and having connection to the tire-tool for manipulating the same, the said connection including a connecting member adapted to be anchored, alternatively to either of the said slidably mounted members, means for driving the two members at different speeds, and a pivoted latch mounted upon the said connecting member and adapted to be turned on its pivot to engage it with the slidably mounted members selectively.

7. In a tire-making machine the combination of a rotatably supported tire core, a tool-carriage movable toward and from the core, an arm pivoted on said tool-carriage, a tool-mounting pivoted on the said arm, a tire-tool journaled on the said tool-mounting, a link having its forward end pivoted to said tool-mounting for turning the latter about its pivot, a tool-actuating member mounted for movement with relation to the carriage and having the rear end of the said link pivoted thereto, means for driving the carriage toward the core and concurrently driving the said tool actuating member with relation to the carriage, means for yieldingly urging the first mentioned arm to hold the tire-tool against the work as the carriage is advanced, and means adapted in a single movement first to anchor the said tool-actuating member to the carriage and then to release it from the driving means as to its movement with relation to the carriage.

In witness whereof I have hereunto set my hand this 20th day of October, 1927.

MERLE C. SCROTE.